(12) United States Patent
Giles et al.

(10) Patent No.: US 12,612,894 B2
(45) Date of Patent: Apr. 28, 2026

(54) CONTROLLING ACTIVATION OF INDIVIDUAL PITCH CONTROL OF WIND TURBINE ROTOR BLADES BASED ON DETECTED WIND EVENTS

(71) Applicant: VESTAS WIND SYSTEMS A/S, Aarhus N (DK)

(72) Inventors: Alexander Duncan Giles, Oporto (PT); Christian Jeppesen, Horsens (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/854,868

(22) PCT Filed: Mar. 29, 2023

(86) PCT No.: PCT/DK2023/050072
§ 371 (c)(1),
(2) Date: Oct. 7, 2024

(87) PCT Pub. No.: WO2023/193866
PCT Pub. Date: Oct. 12, 2023

(65) Prior Publication Data
US 2025/0243844 A1     Jul. 31, 2025

(30) Foreign Application Priority Data
Apr. 7, 2022    (DK) .................................. 202270185

(51) Int. Cl.
*F03D 7/02*      (2006.01)
*F03D 17/00*     (2016.01)
*F03D 80/80*     (2016.01)

(52) U.S. Cl.
CPC ........... *F03D 7/0224* (2013.01); *F03D 7/024* (2013.01); *F03D 7/0204* (2013.01);
(Continued)

(58) Field of Classification Search
CPC ...... F03D 7/0224; F03D 7/024; F03D 1/0664; F03D 1/0667; F03D 1/0669;
(Continued)

(56) References Cited

U.S. PATENT DOCUMENTS 8,239,071 B2 *  8/2012  Lausen ................. F03D 7/0204
322/17
8,880,379 B2 * 11/2014  Miranda ................. F03D 7/046
702/182
(Continued)

FOREIGN PATENT DOCUMENTS

CN      111379665 A     7/2020
CN      112031998 A     12/2020
(Continued)

OTHER PUBLICATIONS

Danish Patent and Trademark Office, 1st Technical Examination including the Search Report and Search Opinion for Application PA 2022 70185 dated Nov. 3, 2022.
(Continued)

*Primary Examiner* — Courtney D Heinle
*Assistant Examiner* — Behnoush Haghighian
(74) *Attorney, Agent, or Firm* — Patterson + Sheridan, LLP; Gero G. McClellan

(57)     ABSTRACT

The invention provides a controller for a wind turbine having three rotor blades, the controller being for controlling activation of individual pitch control of the rotor blades. The controller is configured to receive a flap load signal, from a flap loading sensor of each of the three rotor blades, indicative of flap loading on each of the respective rotor blades.
(Continued)

The controller is configured to determine, based on the received flap load signals, a statistical dispersion parameter of flap loading for each of the rotor blades, the statistical dispersion parameters being indicative of a wind event in a wind field in which the wind turbine operates. The controller is configured to control activation of individual pitch control based on the respective statistical dispersion parameters.

18 Claims, 6 Drawing Sheets

(52) U.S. Cl.
CPC .......... *F03D 17/029* (2023.08); *F03D 80/821* (2023.08); *F05B 2260/70* (2013.01); *F05B 2270/329* (2013.01)

(58) Field of Classification Search
CPC .... F03D 1/0671; F03D 7/0202; F03D 17/029; F03D 80/701
See application file for complete search history.

(56) References Cited

U.S. PATENT DOCUMENTS

| | | | | |
|---|---|---|---|---|
| 9,777,708 | B2 * | 10/2017 | Risager ................. | F03D 7/0224 |
| 10,975,845 | B2 * | 4/2021 | Grunnet ................. | F03D 7/045 |
| 11,300,099 | B2 * | 4/2022 | Jamuna ................. | F03D 7/0224 |
| 2011/0115224 | A1 * | 5/2011 | Lausen ................... | F03D 7/024 |
| | | | | 290/44 |
| 2011/0178771 | A1 * | 7/2011 | Miranda ............ | G05B 23/0294 |
| | | | | 702/182 |
| 2014/0178197 | A1 * | 6/2014 | Risager ................. | F03D 7/0224 |
| | | | | 416/31 |
| 2019/0128242 | A1 * | 5/2019 | Grunnet ................ | F03D 7/0224 |
| 2020/0116126 | A1 * | 4/2020 | Jamuna ................. | F03D 7/0224 |
| 2022/0112878 | A1 * | 4/2022 | Wortmann ............... | F03D 7/04 |

FOREIGN PATENT DOCUMENTS

| | | |
|---|---|---|
| EP | 2191131 B1 | 12/2017 |
| WO | 2010020450 A1 | 2/2010 |
| WO | 2020144063 A1 | 7/2020 |

OTHER PUBLICATIONS

PCT International Search Report and Written Opinion of the International Searching Authority for Application PCT/DK2023/050072 dated Jul. 5, 2023 (May 7, 2023).

* cited by examiner

CONTROLLING ACTIVATION OF INDIVIDUAL PITCH CONTROL OF WIND TURBINE ROTOR BLADES BASED ON DETECTED WIND EVENTS

TECHNICAL FIELD

The invention relates to controlling activation of individual pitch control of rotor blades of a wind turbine. In particular, activation of the individual pitch control is based on detected wind events, such as turbulence and/or shear, in the wind field of the wind turbine.

BACKGROUND

Wind turbines as known in the art include a wind turbine tower supporting a nacelle and a rotor with a number of—typically, three—pitch-adjustable rotor blades mounted thereto. A wind turbine is prone to vibrations, such as tower, nacelle, or rotor blade movement. It is known that certain types of vibrations may be damped by active pitching of the rotor blades or adjusting generator torque. Control strategies for adjusting blade pitch can be used to maximise energy production of a wind turbine while minimising loads experienced by various components of the wind turbine.

Rotor blades may be adjusted as part of a collective pitch control routine, in which each of the (three) blades are adjusted in the same way at the same time, where such collective pitch control may be used to control wind turbine speed, for instance. Rotor blades may also be adjusted as part of an individual pitch control (IPC) routine, in which each blade has its own individual pitch reference, possibly as an adjustment to a collective pitch reference from a collective pitch controller. Individual pitch control may be used to alleviate loads caused by rotational sampling of the wind field in the vicinity of wind turbine as the rotor rotates.

Continuous or excessive activation of an individual pitch controller may cause excessive wear of the pitch bearings. As such, individual pitch control schemes may be combined with activation strategies that allow for certain key loading issues associated with wind turbine operation to be handled or addressed without putting excessive demands on the blade bearing. For instance, individual pitch control may be activated to ensure there is sufficient clearance between the tips of the rotor blades and the wind turbine tower as the rotor blades sweep past the tower, and/or to reduce extreme resultant blade moments.

There is a need to further improve individual blade control to balance the alleviation of loads against ensuring excessive demands are not placed on the blade bearing.

It is against this background to which the present invention is set.

SUMMARY OF THE INVENTION

According to an aspect of the invention there is provided a controller for a wind turbine having three rotor blades, the controller being for controlling activation of individual pitch control of the rotor blades. The controller is configured to receive a flap load signal, from a flap loading sensor of each of the three rotor blades, indicative of flap loading on each of the respective rotor blades. The controller is configured to determine, based on the received flap load signals, a statistical dispersion parameter of flap loading for each of the rotor blades, the statistical dispersion parameters being indicative of a wind event in a wind field in which the wind turbine operates. The controller is configured to control activation of individual pitch control based on the respective statistical dispersion parameters.

The wind event may include, or be, turbulence in the wind field.

Each statistical dispersion parameter may be a standard deviation of flap loading for the respective rotor blade.

The controller may be configured to activate the individual pitch control if the statistical dispersion parameters indicate that turbulence of the wind field is above a prescribed turbulence threshold.

The controller may be configured to determine which of the statistical dispersion parameters has the highest value. The controller may be configured to activate the individual pitch control if said highest value statistical dispersion parameter is above the prescribed turbulence threshold.

The controller may be configured to deactivate the individual pitch control if said highest value statistical dispersion parameter falls below a second prescribed turbulence threshold less than the prescribed turbulence threshold.

In some examples, prior to determining the statistical dispersion parameters, the controller may be configured to remove frequency content, from the received flap load signals, that is targeted by the individual pitch control to obtain modified flap load signals. The statistical dispersion parameters may be determined based on the modified flap load signals.

The individual pitch control may be for targeting 1P frequency content. in such examples, the controller for controlling activation of the individual pitch control may be configured to: obtain, based on the received flap load signals, a flap loading vector in a rotor coordinate frame of the wind turbine; apply an m-blade coordinate transformation to the flap loading vector to obtain first and second mutually orthogonal components in a fixed coordinate frame of the wind turbine, wherein the m-blade coordinate transformation may transform 1P frequency content in the rotor coordinate frame to 0P frequency content in the fixed coordinate frame; remove 0P frequency content from the first and second mutually orthogonal components to obtain 1P removed first and second components; and, apply an inverse m-blade coordinate transformation to the 1P removed first and second components to obtain the modified flap load signals.

The individual pitch control may be for targeting 2P frequency content. Prior to applying the inverse m-blade coordinate transformation, the controller may be configured to apply a further transformation to the first and second components that have had 1P removed—i.e. a further transformation to the so-called '1P removed first and second components—to isolate and remove frequency content corresponding to 2P frequency content in the rotor coordinate frame. The controller may be configured to apply an inverse further transformation to obtain 1P and 2P removed first and second components, the inverse m-blade coordinate transformation being applied to the "1P and 2P removed" first and second components to obtain the modified flap load signals.

Prior to determining the statistical dispersion parameters, the controller may be configured to remove low frequency content, from the received flap load signals, that is indicative of an imbalance in the wind turbine, optionally a rotor imbalance.

The wind event may include, or be, wind shear in the wind field. In such examples, the controller may be configured to: determine an estimation of at least one of a tilt moment and a yaw moment relative to a rotor plane of the wind turbine, the determination being based on the received flap load signals, wherein determining the statistical dispersion parameter may include determining, based on the or each of the determined tilt and yaw moment estimations, a respective statistical dispersion parameter indicative of wind shear in the wind field; determine a rate of change parameter of the or each respective statistical dispersion parameter indicative of wind shear; and, control activation of individual pitch control based on the or each rate of change parameter.

The tilt and/or yaw moment may be determined via a lookup table based on the received flap load signals, wherein values of the tilt and/or yaw moment in the lookup table correspond to the tilt and/or moment in the absence of individual pitch control of the rotor blades.

The controller may be configured to activate the individual pitch control if: the highest value statistical dispersion parameter indicative of turbulence is above the prescribed turbulence threshold; or, at least one of the or each rate of change parameter is above a prescribed shear threshold.

According to an aspect of the invention there is provided a wind turbine comprising a controller as defined above.

According to an aspect of the invention there is provided a method for a wind turbine having three rotor blades, the method being for controlling activation of individual pitch control of the rotor blades. The method comprises receiving sensor data, from a flap loading sensor of each of the three rotor blades, indicative of flap loading on each of the respective rotor blades. The method comprises determining, based on the received sensor data, a statistical dispersion parameter of flap loading for each of the rotor blades, the statistical dispersion parameters being indicative of a wind event in a wind field in which the wind turbine operates. The method comprises controlling activation of individual pitch control based on the respective statistical dispersion parameters.

According to another aspect of the invention there is provided a non-transitory, computer-readable storage medium storing instructions thereon that when executed by one or more processors cause the one or more processors to execute the method defined above.

BRIEF DESCRIPTION OF THE DRAWINGS

Examples of the invention will now be described with reference to the accompanying drawings, in which.

DETAILED DESCRIPTION

Figure 1:
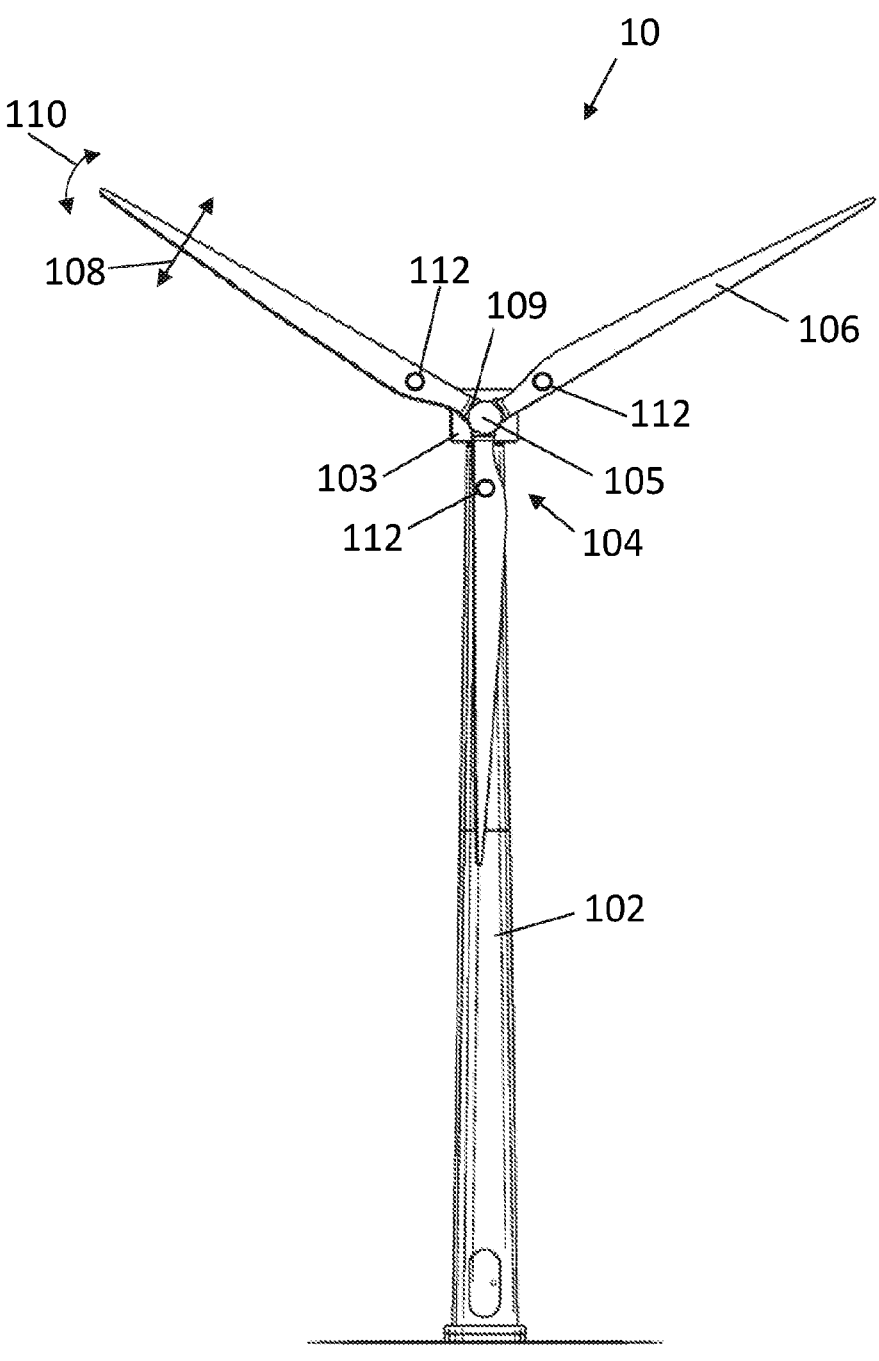
FIG. 1 schematically illustrates a wind turbine in accordance with an aspect of the invention.

FIG. 1 illustrates, in a schematic view, an example of a wind turbine 10. The wind turbine 10 includes a tower 102, a nacelle 103 disposed at the apex of, or atop, the tower 102, and a rotor 104 operatively coupled to a generator housed inside the nacelle 103. In addition to the generator, the nacelle 103 houses other components required for converting wind energy into electrical energy and various components needed to operate, control, and optimise the performance of the wind turbine 10. The rotor 104 of the wind turbine 10 includes a central hub 105 and three rotor blades 106 that project outwardly from the central hub 105. Moreover, the wind turbine 10 comprises a control system or controller (not shown in FIG. 1). The controller may be placed inside the nacelle 103, in the tower 102 or distributed at a number of locations inside (or externally to) the turbine 10 and communicatively connected to one another. The rotor blades 106 are pitch-adjustable. The rotor blades 106 can be adjusted in accordance with a collective pitch setting, where each of the blades are set to the same pitch value. In addition, the rotor blades 106 are adjustable in accordance with individual pitch settings, where each blade 106 may be provided with an individual pitch setpoint.

The wind turbine 10 may include blade load sensors placed at, or in the vicinity of, each blade root 109 in a manner such that the sensor detects loading in the blade 106. Blade load signals from such sensors may be used to determine how to adjust the pitch of each of the individual blades 106. Depending on the placement and the type of sensor, loading may be detected in the flap (flapwise) direction 110 (in/out of plane) or in the edge (edgewise) direction 108 (in-plane). Such sensors may be strain gauge sensors or optical Bragg-sensors, for instance. As the sensors are placed on the rotating blades 106, such load signals for each of the adjustable rotor blades 106 are measured in the rotating reference frame of the rotor 104. Shown within each blade 106 of FIG. 1 is a blade load sensor 112. In different examples, more than one blade load sensor may be provided in each blade. The blade load sensors 112 of the described example are arranged to measure flap loading on the blades 106.

Figure 2:
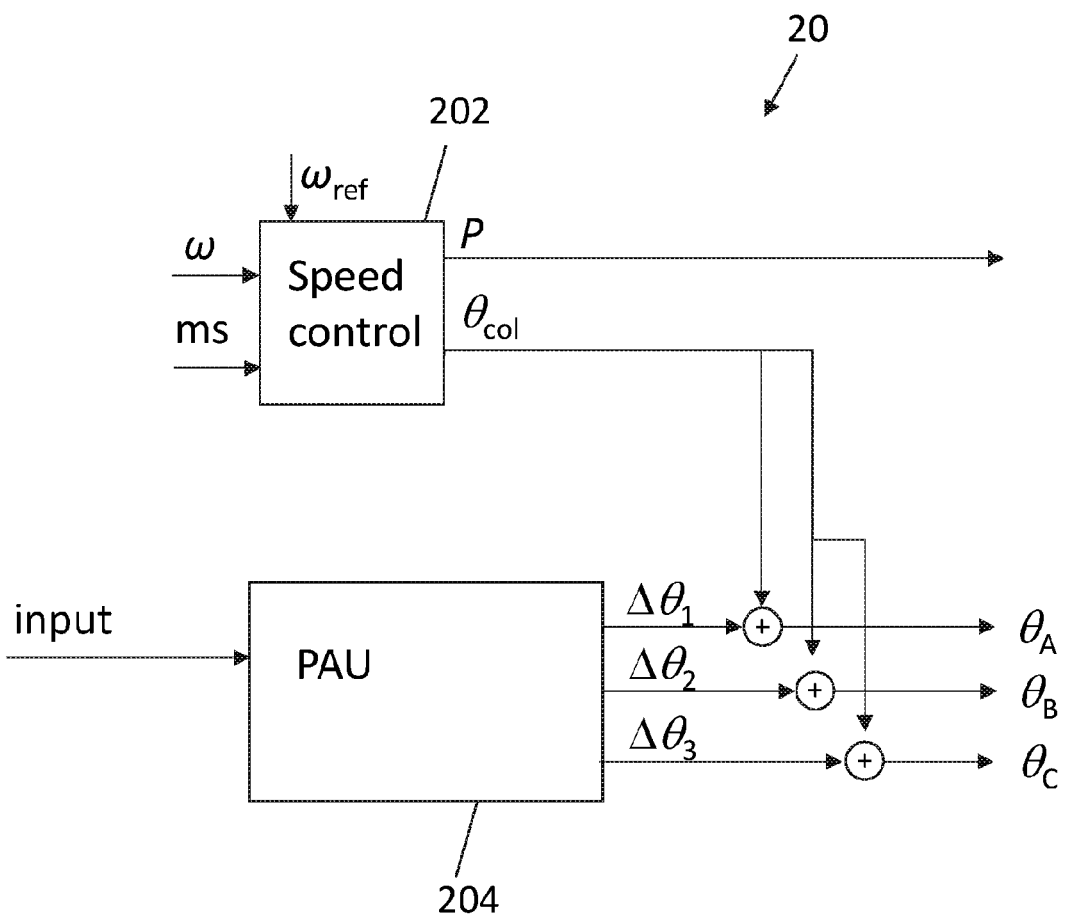
FIG. 2 schematically illustrates an overall controller of the wind turbine of FIG. 1 in accordance with an aspect of the invention.

FIG. 2 schematically illustrates an example of an overall controller 20 of the wind turbine 10 implemented to determine individual pitch actuation signals capable of reducing blade loads experienced by the rotor blades 106. In the illustrated implementation, a speed controller (control module/block) 202 of the overall controller 20 minimises a speed error $(\omega - \omega_{ref})$ between the actual rotor speed, $\omega$, and a reference rotor speed, $\omega_{ref}$, in order to output a requested power P (in the form of a power setpoint) and a collective pitch reference, $\theta_{col}$. The collective pitch reference as determined by the speed controller 202, in view of the rotor speed, may also take further sensor values into account. This is referred to in FIG. 2 as a measurement set, ms, being input into the speed controller 202. The feedback speed controller 202 may be implemented by a PI (proportional-integral), PID (proportional-integral-derivative), or similar control scheme. In one example, the speed controller 202 may alternatively be a model predictive controller which, based on minimising a cost function, is arranged to determine the collective pitch reference and/or the power reference.

FIG. 2 further illustrates a control block/module or controller 204, of the overall controller 20, which may be referred to as a pitch actuation unit (PAU). In the pitch actuation unit 204, pitch modification signals $(\Delta\theta_1, \Delta\theta_2, \Delta\theta_3)$ are being determined based on one or more input signals. In some examples, the input signals include blade load signals from load sensors 112 in the blades 106.

The PAU 204 determines pitch modification signals, or pitch reference offset values, $(\Delta\theta_1, \Delta\theta_2, \Delta\theta_3)$ for each rotor blade 106. These offsets are superimposed onto the collective pitch reference to provide resulting or overall pitch modification signals $(\theta_A, \theta_B, \theta_C)$ that can be applied to the pitch actuators of the rotor blades 106 individually.

In the example shown in FIG. 2, a collective pitch reference for the pitch-adjustable rotor blades 106 is being determined based on a rotor speed, and a resulting pitch modification signal is applied to the pitch-adjustable rotor blades 106. The resulting pitch modification signal is applied to the pitch-adjustable rotor blades 106 individually, and for each individual blade 106 is based on a signal of the collective pitch reference and the respective individual pitch modification signal. In one example, the individual pitch modification signal is being applied in a cyclic manner. Thus, pitch actuation signals are determined for each pitch adjustable rotor blade 106 based on the pitch modification signal for each rotor blade 106.

The described controller 20 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

The present invention is directed towards improved activation strategies for individual or cyclic pitch control of wind turbine rotor blades. The improved activation strategies aim to optimise a balance between alleviation of component loading that is achievable via the implementation of individual pitch control (IPC), while not putting excessive demands on a wind turbine blade bearing as a result of individual pitch control being activated. In particular, the invention provides for the detection of wind events in the vicinity of a wind turbine that are associated with an increased likelihood of high component loading, and providing for activation of component loading alleviation via individual pitch control upon detection of such wind events.

In some examples, the present invention advantageously takes into account a level of turbulence (as one form of wind event) in a wind field in which a wind turbine operates as at least part of an activation strategy for individual pitch control. Strongly turbulent wind fields are relatively uncommon, meaning that they do not contribute (significantly) to net energy production. As such, there is little economic incentive to design a wind turbine rotor that can withstand the high wind turbine component loading associated with energy capture in such wind fields. The invention therefore beneficially provides for activation of individual pitch control—to alleviate loads on certain components—that exhibits a bias towards relatively high turbulence wind fields. In particular, this is achieved via a consideration of statistical dispersion parameters, e.g. standard deviation, of blade flap loading on wind turbine blades, which is indicative of wind turbulence in the vicinity of a wind turbine. It may be that activating an individual pitch controller to reduce 1P and optionally 2P frequency components may be an appropriate response only when certain levels of turbulence are detected: for higher levels of turbulence then wind turbine operation may need to be modified using a different control function to quickly reduce power, e.g. using a variable thrust limiter.

In some examples, the present invention advantageously takes into account wind shear (as a form of wind event) in a wind field in which a wind turbine operates as at least part of an activation strategy for individual pitch control. In particular, a statistical dispersion, e.g. standard deviation, of tilt and yaw moments relative to a wind turbine rotor plane (i.e. tilt and yaw moments on, or experienced by, the wind turbine rotor) can be indicative of vertical and horizontal shear, respectively. As shear events that may cause high component loading may be relatively transient in nature, then a consideration of a rate of change of the respective statistical dispersion parameters associated with tilt and yaw moments can be used as part of an activation strategy for individual pitch control used to alleviate loads.

In the described example, the PAU 204 of FIG. 2 is used to determine the pitch adjustment values, or pitch reference offset values, $\Delta\theta_1$, $\Delta\theta_2$, $\Delta\theta_3$ for each rotor blade 106 to target certain frequency or vibrational modes, in order to alleviate component loading, as part of an individual pitch control routine. The PAU 204 is then also used to determine whether to activate such individual pitch control—i.e. whether or not to apply the pitch reference offset values, $\Delta\theta_1$, $\Delta\theta_2$, $\Delta\theta_3$, to the collective pitch reference, $\theta_{col}$, to be output by the controller 20—based on a detection of wind events such as turbulence or shear.

Figure 3:
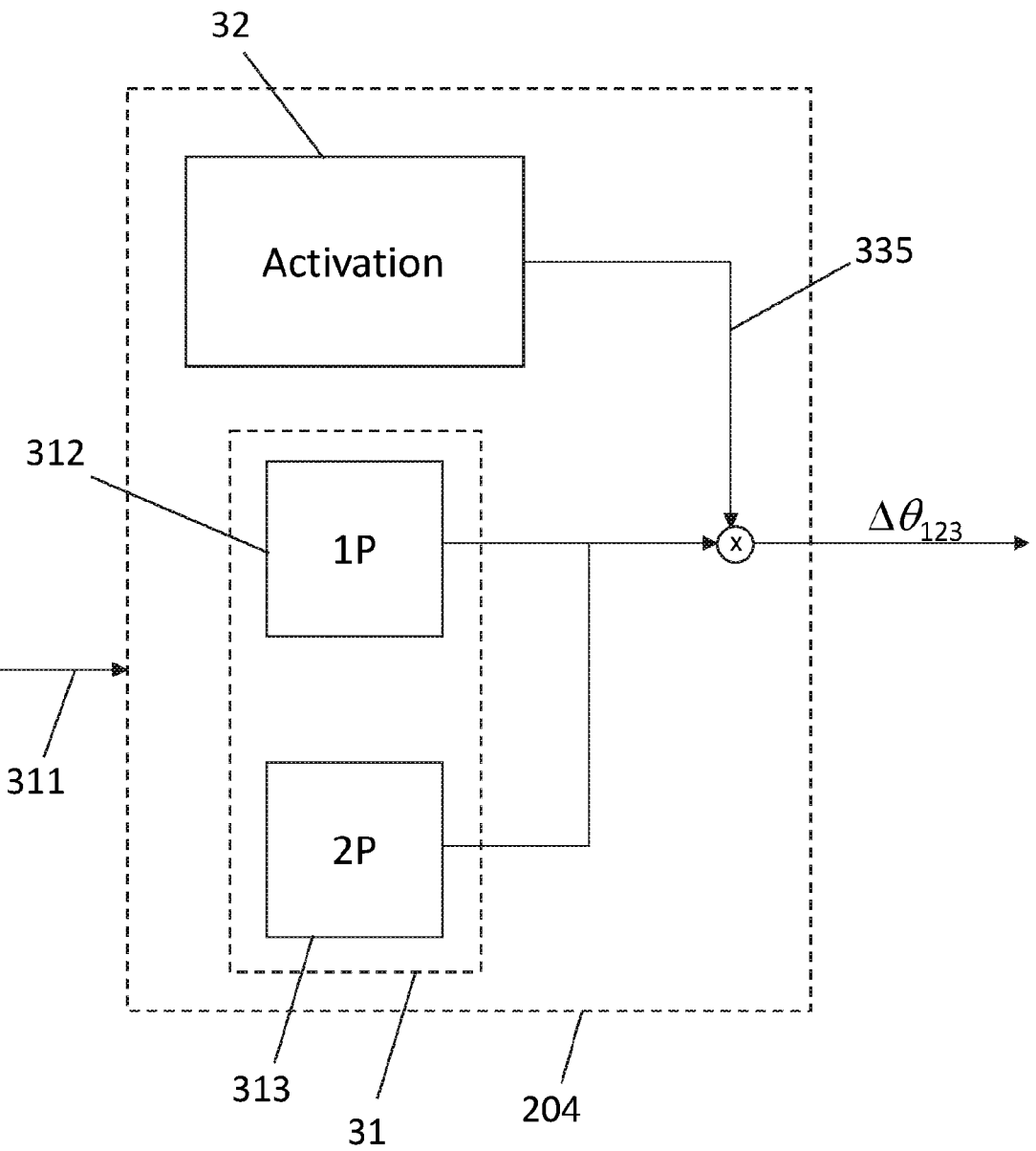
FIG. 3 schematically illustrates modules or components of a pitch adjustment unit of the controller of FIG. 2.

FIG. 3 schematically illustrates functional or processing blocks/modules/units of the PAU 204 in one example in accordance with the invention. In particular, the PAU 204 includes an individual pitch controller or module 31 for determining pitch adjustment values for the rotor blades, for instance to counteract certain frequency modes in an input signal 311.

The input signal 311 is sensor data from the blade load sensors 112. In the described example, the blade load sensors 112 are flap load sensors that indicate loading on the respective blade 106 in the flapwise direction. As mentioned above, in the described example each blade 106 has a flap load sensor 112. The PAU 204 may receive data from each of the sensors 112.

In the described example, the individual pitch controller 31 targets or counteracts so-called 1P and 2P frequency content in the input signal 311. The individual pitch controller 31 may in fact be separate 1P and 2P controllers 312, 313 for generating pitch adjustment values for counteracting 1P and 2P frequency content, respectively. 1P frequency is a rotational frequency of the wind turbine rotor, i.e. the frequency with which a full rotation of the rotor is completed. 2P cyclic disturbances in a rotor coordinate frame (rotating reference frame) are twice the rotor rotational frequency, but such disturbances can appear at 3P in a fixed coordinate frame. As such, a 2P controller 313 may be used to counteract vibrational modes at 3P in the fixed frame, where 3P is the frequency at which the rotor blades pass the tower in a three-blade wind turbine, i.e. three times per complete rotation of the rotor.

In the 1P controller 312, the sensor data 311 received from the flap load sensors 112 may be used to obtain a three-dimensional vector, where each value of the vector indicates a flap bending moment associated with a respective one of the three blades 112. The flapwise load signals are measured in a rotating or rotor reference frame. The rotating reference frame may be in a rotor rotational plane of the wind turbine 10, and may be centred at the rotor 104, for instance.

The flapwise load signals may be coordinate transformed by an m-blade (multi-blade) coordinate transformation. The transformation takes the three rotating signals into a fixed reference frame along a first reference direction d and a second reference direction q. The m-blade coordinate transformation may be in the form of a Coleman transformation. The Coleman transformation may be defined as follows:

$$\begin{bmatrix} M_d \\ M_q \end{bmatrix} = \begin{bmatrix} \cos(\psi) & \cos(\psi + 2\pi/3) & \cos(\psi - 2\pi/3) \\ \sin(\psi) & \sin(\psi + 2\pi/3) & \sin(\psi - 2\pi/3) \end{bmatrix} \begin{bmatrix} M_a \\ M_b \\ M_c \end{bmatrix}$$

where $M_{abc}$ is the bending moment vector (in the rotor coordinate frame), which in the described example is in the flap direction (but in different examples could be in the edge direction), $\psi$ is the (1P) phase, and $M_{dq}$ is a vector in the fixed coordinate frame.

When $M_{abc}$ is the vector containing the out-of-plane blade root bending moments and the phase is set as the rotor azimuth, the directions d, q are tilt and yaw directions; however, in general, the Coleman transformation simply transforms the rotating signals into mutually orthogonal first and second components in the fixed reference frame.

Still referring to the 1P controller 312, the blade flap bending moments $M_a$, $M_b$, $M_c$ may be pre-processed or filtered prior to undergoing the coordinate transformation to remove signal content that is not needed. For instance, frequency content in the input signal 311 related to imbalances in the blades 106 may be removed by application of a high-pass filter, in particular applied equally to each of the three blade load signals.

The m-blade transformation may then be applied to the (possibly pre-filtered) flap bending moment vector $M_{abc}$ to obtain the vector $M_{dq}$ including the first and second components $M_d$, $M_q$, as described above. As a result of this transformation, 1P content (i.e. rotor rotational frequency content) in the input signal appears at 0P in the transformed signal. One or more further filters, e.g. low-pass filters, may then be applied to the components in the fixed frame to remove cyclic loads other than 1P cyclic loads. Once the 1P content has been isolated in this manner, then a control action for counteracting it, or mitigating its effect, is determined. This may include a PI (proportional integral) control module applied to the respective components to obtain control components in the fixed frame. An inverse m-blade transformation may then be applied to the control components in the fixed frame to obtain control components in the rotor frame, in particular in the form of pitch modification signals to be applied to the pitch angle settings for the respective rotor blades to counteract 1P content.

The 2P controller 313 may operate in a corresponding manner. Like in the 1P controller 312, in the 2P controller 313 the sensor data 311 received from the flap load sensors 112 may be used to obtain a three-dimensional flap bending moment vector. The input signal may be pre-processed to remove frequency content related to imbalances in the rotor 104. An m-blade transformation may be applied as in the 1P controller 312 to obtain components in the fixed frame. As mentioned above, this transformation results in 1P content in the input signal appearing at 0P in the transformed signal. Also, 3P content in the input signal corresponds to collective flap load, and this disappears in the transformed signal. In addition, 2P and 4P content in the input signal (in the rotor frame) appears at 3P in the transformed signal (in the fixed frame); 5P and 7P content in the input signal (in the rotor frame) appears at 6P in the transformed signal (in the fixed frame).

In order to target 2P content in the input signal (as required in the 2P controller 313), a further transformation may therefore be applied to isolate this content in the transformed signal. In particular, the transformation may be based on a phase of the 3P content. In one example, the following transformation is applied:

$$\begin{bmatrix} M_{d,3P} \\ M_{q,3P} \end{bmatrix} = \begin{bmatrix} \cos\psi_{3P} & \sin\psi_{3P} \\ -\sin\psi_{3P} & \cos\psi_{3P} \end{bmatrix} \begin{bmatrix} M_d \\ M_q \end{bmatrix}$$

where $\psi_{3P}$ is the 3P phase, and $M_{d,3P}$, $M_{d,3P}$ are first and second 3P components.

In this frame of reference, the 2P content in the original input signal (in the rotor frame) appears at 0P, whereas the 4P content in the original input signal now appears at 6P and so can be removed by application of a low-pass filter, for instance. Similarly to the 1P controller 312, once the 2P content has been isolated in this way then a control action for counteracting it, or mitigating its effect, is determined, in particular to obtain control components in this frame of reference. Inverse transformations (e.g. to return to 1P phase and then to return to the rotor frame) may then be applied to the control components to obtain pitch modification signals to be applied to the pitch angle settings for the respective rotor blades to counteract 2P content.

Returning to FIG. 3, the PAU 204 also includes an activation controller or module 32 for determining whether the pitch adjustment values determined by the individual pitch controller 31 are to be included in, or applied to, the pitch reference settings output by the overall controller 20 as control actions to the relevant pitch actuator(s).

As outlined above, the activation controller 32 provides for biasing activation of the individual pitch controller 31 in certain wind event conditions. In the described example, the activation controller 32 takes into account wind events in the form of turbulence and wind shear. In a broad sense, a level of turbulence of the wind field in which the wind turbine 10 operates may be detected based on the flap bending moment sensor data obtained from the blade load sensors 112. In particular, a statistical dispersion parameter, e.g. standard deviation, of the sensor data is indicative of a level of turbulence of the wind field. Also, a level of wind shear of the wind field may be detected based on estimates of tilt and yaw moments of the rotor blades 106, for vertical and horizontal shear, respectively. In particular, a rate of change of a statistical dispersion parameter, e.g. rate of change of standard deviation, of the estimations is indicative of transient shear events. If both turbulence and wind shear are considered in the activation controller 32, then the respective detections may be combined to determine an overall activation gain or parameter to be applied to pitch modification signals determined by the individual pitch controller 31.

An important consideration in examples of the present invention concerns which parts of the blade load signal to include in the detection of turbulence. In particular, it may be desirable to have an activation routine that does not couple to control features, as this may result in excessive activation of pitch control and have an associated cost on the blade bearing. In the described example, the overall controller 20 provides for collective pitch control, as well as 1P and 2P cyclic or individual pitch control. To guard against coupling to these control features, the determination or estimation of turbulence in the activation controller 32 may therefore be based on content above 2P in the blade flap load signal.

Figure 4:
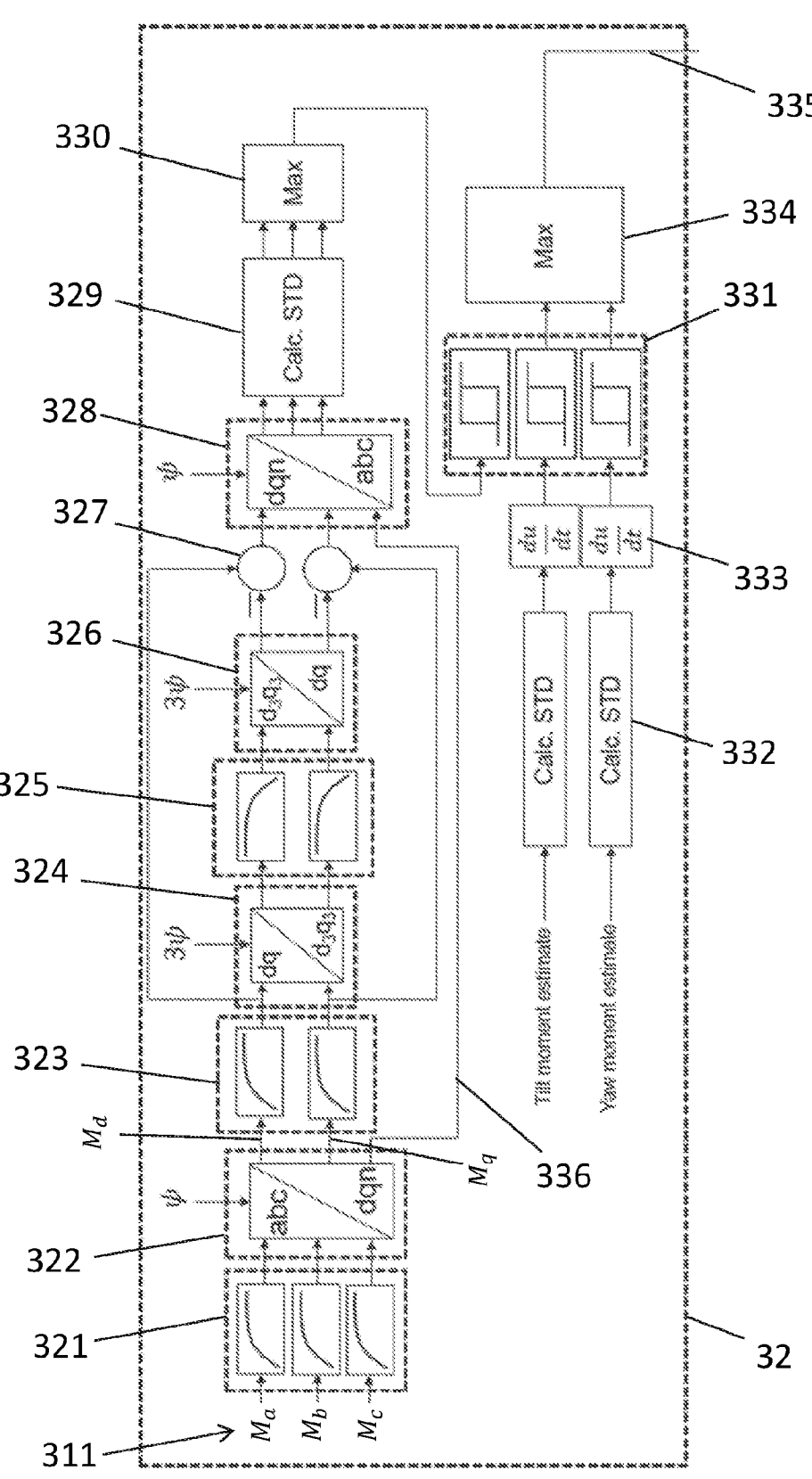
FIG. 4 schematically illustrates an activation module or controller of the pitch adjustment unit of FIG. 3.

FIG. 4 illustrates modules of the activation controller 32 in one example. The sensor data 311 received from the flap load sensors 112 provides the blade flap bending moments $M_a$, $M_b$, $M_c$ for the respective rotor blades 106. As mentioned, prior to determining a level of turbulence in a wind field of the wind turbine 10 based on the received sensor data, the flap load signals are modified to remove frequency content that is indicative of imbalance and that is targeted by the individual pitch controllers 312, 313 of the overall controller 20 of the wind turbine 10. As such, in the activation controller 32 the received blade flap signals are first processed in control block 321 to remove relatively low frequency content that may be indicative of imbalance in the wind turbine, e.g. rotor imbalance. For instance, this may be performed by application of a high pass filter to each of the respective signals.

In order to remove 1P frequency content in the input signal 311 that is targeted by the 1P controller 312, the control block 322 is applied in the activation controller 32 to apply an m-blade transformation to the flap loading vector formed by the (pre-processed) blade flap bending moments. In particular, a Coleman transformation may be applied as above to transform the input signal from the rotor rotational frame to the fixed frame, which puts the 1P term in the input signal to 0P in the fixed frame. This content can then be removed by application of an appropriate high pass filter in control block 323.

It is desired to retain the collective flap load components 3P, 6P, 9P, etc. from the input signal for the subsequent analysis. The output of the Coleman transformation control block 322 includes the components in the d and q directions, i.e. $M_d$ and $M_q$, which are input into the high pass filter control block 323. The components $M_d$ and $M_q$ include only asymmetric cyclic loads in the input signal. That is, the components $M_d$ and $M_q$ retain content relating to 1P, 2P, 4P, 5P, 7P, 8P, etc. in the rotating frame. A separate channel or output 336 from the Coleman transformation control block 322 then includes the symmetric or collective loading components in the input signal, i.e. content relating to 3P, 6P, 9P, etc. in the rotating frame. This symmetric component simply corresponds to the sum of the components of the bending moment vector $M_{abc}$ defined above. Note that the 0P component in the rotating frame in the input signal does not appear in the output of the Coleman transformation control block 322 because it is filtered out in the high pass filter control block 321. Also note that, while the components $M_d$ and $M_q$ are input to the control block 323, the collective or symmetric components 326 bypass this block.

In order to remove 2P frequency content in the input signal 311 that is targeted by the 2P controller 313, the control block 324 applies a further transformation to the components in the fixed frame obtained from the 1P removal control block 324. In particular, the further transformation may be the one described above based on the 3P phase. As mentioned above, this means that the 2P content in the original input signal (in the rotor frame) appears at 0P. Application of an appropriate filter, e.g. low pass filter, at control block 325 may then be used to remove other frequency content (from the original input signal) in the components, in particular 4P, 5P, 7P, 8P, etc. The 2P content therefore remains in the signal components that are then inverse transformed (relative to the 3P phase transform) at control block 326.

By subtracting, at the subtraction module 327, the components obtained from control block 326 from the components obtained from the control block 323 (i.e. prior to applying the 3P phase transform), the 2P content in the original signal is removed, while leaving the 4P, 5P, 7P, 8P, etc. content. This, along with the collective components 3P, 6P, 9P, etc. 336 obtained from the control block 322, is input into the inverse m-blade transformation control block 328 to return the processed signals from the fixed frame to the rotor frame. That is, in the described example the processed signals include all frequency content above 2P, i.e. 3P, 4P, 5P, 6P, 7P, etc.

The processed signal components—i.e. processed to remove low frequency, 1P and 2P content—are now used to determine the standard deviation (or other statistical dispersion parameter in different examples) of each of the signals (i.e. for each blade 106) at control block 329. The standard deviation may be determined in any suitable manner. The standard deviation may be based on sampled data over a defined time period. The standard deviation may be updated at each sampling instant of the controller, e.g. each instant that sensor data is received from the sensors.

In the described example, the maximum of the three calculated standard deviation values is then determined or identified at control block 330 for input into the relay function block 331. That is, in the described example only the blade load signal with the highest standard deviation is used in the determination of the activation gain for individual pitch control. The highest standard deviation value is indicative of the highest level of detected turbulence in the wind field of the wind turbine 10.

In some examples, only the detected turbulence level is used to determine the activation gain output by the activation controller 32. In such examples, the highest standard deviation signal is passed to the relay function block 331 for comparison against a threshold value. If the highest standard deviation value is greater than the threshold then the relay will be set to one and the activation gain output by the activation controller 32 will be one, meaning that individual pitch control is activated (because the detected turbulence is sufficiently high).

It will be understood that other metrics based on the standard deviation of blade load signals may be used, as an additional or alternative metric describing a turbulence wind event, such as a rate of change of standard deviation, i.e. a time derivative of the standard deviations.

In the described example, the activation controller 32 also takes into account wind shear events in the determination of the activation gain output by the activation controller 32. In particular, the activation controller 32 is provided with estimations of tilt and yaw moments of the rotor blades 106. The tilt and yaw moments indicate the blades moments out of the plane defined by the rotor 104 in tilt and yaw directions, respectively.

The tilt and yaw moment estimations (blade root bending moments) may be based on blade load sensor data. In particular, the tilt and yaw moment estimations may be performed by using the flap load signals and lookup tables, such as BEM (Blade Element Momentum) lookup tables. Specifically, the actual tilt and yaw moments may be obtained from the measured flap load signals; however, these actual tilt and yaw moments will include the influence of individual pitch control (by the individual pitch control module 31). For control purposes, it is desired to obtain an estimate of the tilt and yaw moments that would be observed in the absence of the individual pitch control action. It is for this reason that the measured flap load signals are combined with BEM tables to obtain tilt and yaw moment estimations. The measured tilt and yaw moments may be deduced from the measured flap loads by appropriate application of a Coleman transformation. The measured flap loads may be modified so that they express blade out-of-plane bending moments, with a Coleman transformation then being applied to the out-of-plane bending moments. Then, in order to remove the influence of the individual pitch control, the BEM lookup tables may first be linearised to address the influence of individual pitch control associated with relatively small angles of rotor blade pitch, and then combined with the measured 1P and 2P cyclic pitch signals (in the described example), with said pitch signals being determined by subtracting the collective pitch angle from the measured pitch angle on each blade. This gives an estimate of the effect of the individual pitch controllers on the tilt and yaw moments; thus, adding these estimated values to the tilt and yaw moments provides an estimate for what the tilt and yaw moments would be in the absence of the individual pitch control. This allows activation of the individual pitch controller(s) based purely on the environmental wind conditions in the vicinity of the wind turbine.

The standard deviation of the respective tilt and yaw moments are calculated at control blocks 332, for instance in a corresponding manner to control block 329. While turbulence may be regarded as being more continuous in nature, such that it is the standard deviation itself that is of interest in that regard, wind shear events may be regarded as being more transient in nature. As such, in the described example it is the rate of change of standard deviation of the tilt and yaw moment estimations that is of interest. Therefore, at control block 333 the time derivative of the respective standard deviation values from control block 332 is determined, and these derivatives are passed to the relay function block 331. It will be understood that in different examples only one of the tilt and yaw moments may be used when determining activation gain. It will also be understood that standard deviation of the tilt and/or yaw moment estimations may additionally or alternatively be taken into account (rather than, or in addition to, the derivatives).

In the relay function control block 331, a relay function is applied to each of the three received signals to obtain a binary output for each. In particular, if the input values are greater than a respective threshold value then the relay function outputs one, else zero. These binary outputs are then passed to the control block 334, which identifies the maximum of the three binary outputs as the activation gain. In other words, in the described example if any of the three values input to the relay function are greater than their respective threshold (indicating a minimum level of turbulence or horizontal/vertical wind shear) then the output activation gain 335 is one, i.e. individual pitch control is activated. In different examples, two or all three of the binary outputs may need to be one to set the output activation gain 335 to be one.

In further different examples, an activation gain other than zero or one may be possible. In particular, an activation gain between zero and one may be determined based on the values input into the block 331 relative to one or more respective threshold values.

Referring back to FIG. 3, it is seen that the output activation gain 335 from the activation controller 32 is combined with the pitch modification signals output by the 1P and 2P controllers 312, 313 in the multiplier 315. As such, if the activation gain 335 is one then individual pitch control is activated such that the determined pitch modification signals are applied to the pitch references being output by the controller 20 (see FIG. 2). On the other hand, if the activation gain 335 is zero then individual pitch control is deactivated, i.e. the pitch modification signals are set to zero.

Figure 5:
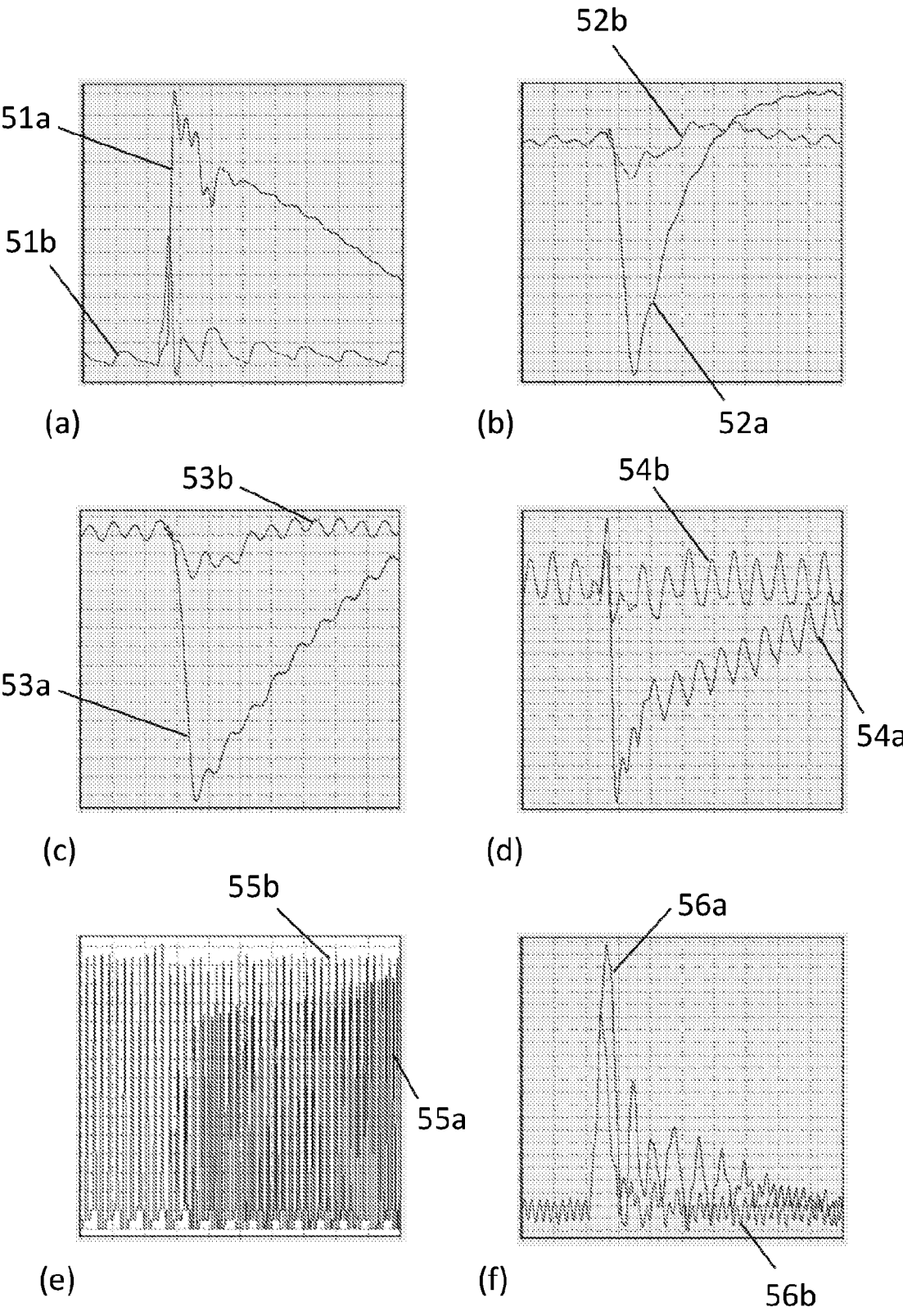
FIG. 5 shows plots illustrating results obtained by implementing the controller of FIG. 2 in the case of a first wind shear event; and, FIG. 6 summarises the steps of a method performed by the controller of FIG. 2.

FIG. 5 shows plots illustrating results obtained when activation of individual pitch control as described above is utilised in the case of a horizontal wind shear event. In FIG. 5, the plots indicated with references ending in 'a' indicate the results when the described activation scheme is not used, whereas the plots indicated with references ending in 'b' indicate the results when the described activation scheme is used.

FIGS. 5(a) to 5(f) show plots of blade pitch (in degrees) 51, generator speed (rpm) 52, power (KW) 53, flap moment (kNm) 54, blade tip deflection at tower passage (m) 55, and main bearing yaw moment (kNm) 56, respectively, each against time. When the described activation scheme is not used the wind event is detected significantly later than when it is used. This means that, as may be seen in FIG. 5, when the described control scheme is used, lower flap loads—and, by extension, lower resultant blade root moment—are experienced, and also superior power and generator speed performance are achieved.

Figure 6:
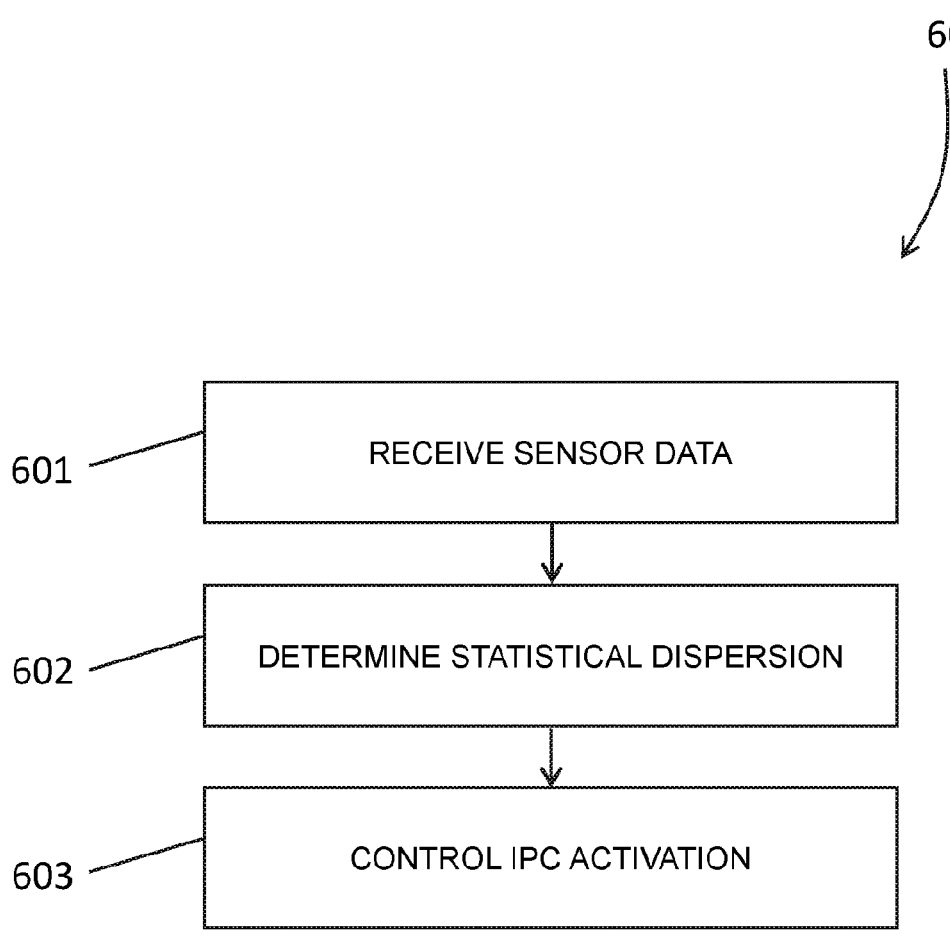

FIG. 6 summarises the steps of a method 60 that is performed by the PAU 204 including the activation controller 32 (as part of the overall controller 20) to control activation of individual pitch control of the rotor blades 106 of the wind turbine 10. At step 601, the controller 32 receives a flap load signal, from a flap loading sensor 112 of each of the three rotor blades 106, indicative of flap loading on each of the respective rotor blades 106.

At step 602 of the method 60, the controller 32 determines, based on the received flap load signals, a statistical dispersion parameter of flap loading for each of the rotor blades, the statistical dispersion parameters being indicative of a wind event in a wind field in which the wind turbine operates. In the described examples, standard deviation is used as the statistical dispersion parameter; however, in different examples the statistical variance or another suitable parameter may be used.

In the described examples, each of turbulence wind events, horizontal wind shear events, and vertical wind shear events is considered by the activation controller 32. It will be understood, however, that any combination of one or more of these types of wind event may be considered in different example implementations of the activation controller 32.

For the consideration of turbulence, the standard deviation of the flap load signal for each respective rotor blade 106 may be determined. In different examples, the standard deviation of only one or two of the rotor blades 106 may instead be determined. Prior to determining the standard deviation, the received blade flap load signals may be processed to remove certain frequency content, where it is then the standard deviation of the processed/modified signals is determined. In general, the blade flap load signals may be processed to remove frequency content that is targeted by individual pitch control routines implemented by the wind turbine. In the described example, the wind turbine 10 includes individual pitch controllers 31 that target 1P and 2P frequency content, and so in the described example the activation controller 32 processes the blade load signals to remove 1P and 2P frequency content prior to determining the standard deviation. That is, the standard deviation is determined based on frequency content above that which is targeted by the individual pitch controllers, i.e. content above 2P in the described example. In an example in which individual pitch control targets only 1P content, then the standard deviation may be determined based on content above 1P, i.e. including 2P. Low frequency content indicative of imbalance may also be removed from the received blade load signals prior to determining the standard deviation.

For the consideration of vertical and horizontal shear, the flap load signals may be used to estimate tilt and yaw moments experienced by the rotor 104, as outlined above. In the described example, the standard deviation of the respective tilt and yaw moments may be determined, and then the respective derivatives of the determined standard deviations may be determined.

At step 603 of the method 60, the controller 32 controls activation of individual pitch control of the wind turbine 10 based on the determined respective statistical dispersion parameters. Determining activation based on the determined statistical dispersion parameters can include the parameters, e.g. standard deviations, themselves, and/or a derivative of the parameters with respect to time (which can include first, second, third, etc. order derivatives), e.g. rate of change of standard deviation, as in the described example.

In the described example, the standard deviation of the respective (modified) blade load signals are determined and the maximum standard deviation value is identified. This maximum value, together with the derivatives of the standard deviations for the estimated tilt and yaw moments, respectively, are processed in a relay function to ascertain if they are greater than respective threshold values. The output for each of the three signals is zero—if the input is below the respective threshold, indicating the intensity or severity of the particular wind event is below a certain level—or one—if the input is above the respective threshold, indicating the intensity or severity of the particular wind event is above a certain level. These binary values may then be passed to a functional unit that identifies the maximum, and this maximum value is then used as the gain to be applied to the signals from the individual pitch controller 31. Hence, in the described example, if any of the binary values is one then the gain is set to one such that individual pitch control is activated, whereas if each of the binary values is zero then the gain is set to zero such that individual pitch control is deactivated.

Hysteresis may be introduced for activation and deactivation thresholds to guard against repeated activation and deactivation of individual pitch control. For instance, the threshold to deactivate individual pitch control may be less than the threshold to activate it in the first place in the relay function. In particular, in the above-described example in which three signals are input into the relay functional unit 331, when one or more of the outputs of the relay functional unit 331 is one—such that individual pitch control is activated—each of the three outputs of the relay functional unit 331 need to return to zero before individual pitch control is activated. That is, if the turbulence level is deemed to fall below its deactivation threshold (which may be less than its activation threshold), then individual pitch control will remain activated if the wind shear level remains above its deactivation threshold.

In this regard, it is noted that each of the three signals input into the relay functional unit 331 has its own activation and deactivation thresholds. That is, the activation and deactivation thresholds associated with the turbulence level may be different from the activation and deactivation levels associated with the rate of change of tilt moment level, which in turn may be different from the activation and deactivation levels associated with the rate of change of yaw moment level. In some examples, the rate of change of tilt and yaw moments may have the same activation and deactivation thresholds.

It is further noted that the respective activation/deactivation thresholds for the turbulence and wind shear levels may be varied dynamically for different operating points of the wind turbine. For instance, the activation (and deactivation) threshold for turbulence may be scaled with wind speed. This is because turbulence intensity is directly proportional to the product of mean wind speed and standard deviation (or other statistical dispersion parameter) in the wind speed. A higher standard deviation is exhibited in the flap load signals for higher wind speeds. As examples of the present invention are intended to activate in the case of more extreme wind events, such as extreme turbulence, then the activation threshold for the turbulence level may be increased for increased wind speed so that activation of individual pitch control is not triggered at 'normal' or 'standard' levels of turbulence at high wind speeds, but that activation is instead reserved for relatively extreme levels of turbulence.

In a similar manner, the activation (and deactivation) threshold for (rate of change of) wind shear may be scaled with blade pitch angle. This is because wind shear events—which may be relevant to tower clearance as the blades rotate—may only be of interest in the vicinity of the elbow or knee of the power curve, i.e. just below a full-load region of operation of the wind turbine. For instance, therefore, a lower activation threshold (higher sensitivity) for tilt and/or yaw shear may be set when the operating point of the wind turbine is in the vicinity of the elbow or knee of the power curve, and a higher activation threshold (lower sensitivity) when the wind turbine is operating deeper into the full-load region.

Many modifications may be made to the described examples without departing from the scope of the appended claims.

In the described example, an activation strategy that takes into account both detected wind turbulence and wind shear is described; however, it will be understood that in different examples an activation strategy that takes into account only one of these may be provided. It will also be understood that the described activation strategies that take into account one or both of detected turbulence and shear may be combined with activation strategies that take into account different factors, such as other wind events or certain levels of fatigue, to provide an overall activation strategy for individual pitch control.

In the described example, an activation gain as part of the described activation strategy (based on certain wind events) is applied to an output of the one or more individual pitch controllers (1P, 2P controllers, etc.). It will be understood that different activation gains may be applied within the individual pitch controllers. For instance, an activation gain may be applied to the pitch modification settings determined in the 1P or 2P controllers in dependence on a level of component excitation generated in one or more particular wind turbine components as a result of 1P or 2P frequency content, respectively, in the input signals, so that individual pitch control is activated only when needed.

In the above-described example, the input signal is transformed into a fixed frame in order to remove 1P and 2P frequency content with appropriate high/low pass filters. In different examples, 1P and/or 2P content may be removed in the rotor frame—i.e. without transforming into the fixed frame—via the use of appropriate notch filters at 1P and/or 2P, for instance.

In the above-described example, blade flap load measurements/signals are processed to remove low frequency content, and then the standard deviation of these processed signals is determined to estimate a level of turbulence in the wind field. In particular, in the above-described example 1P and 2P frequency content is removed as part of this process (as individual pitch controllers targeting 1P and 2P content are provided). In different examples, instead of removing the 2P frequency content component in the blade flap load signals prior to determining the standard deviation, a term to compensate for the 2P cyclic load may be applied to the measured blade flap signals (which may have been processed to remove 1P content), and the standard deviation is then determined based on the obtained signal including the compensation term. This approach has the advantage of retaining more of the received input signal from which a determination of turbulence level can be made, and different types of turbulence conditions may be identified more easily. The compensation may be performed in any suitable manner. For instance, this may be performed in a corresponding manner to the compensation described above for the wind shear determination. In particular, the measured blade load signal may be combined with a difference term (load delta) associated with the 2P cyclic pitch activity, i.e. a term indicative of the influence of the 2P individual pitch control. This difference term or load delta may be determined by isolating the 2P frequency content in the measured blade load signals, and using a lookup table (e.g. BEM lookup tables, similar to as described above for wind shear) to estimate what this part of the signal would be in the absence of individual pitch control. In further examples, instead of removing the 1P content prior to determining the standard deviation, a term to compensate for the 1P content difference resulting from 1P individual pitch control may be applied to the measured blade load signals.

The invention claimed is:

1. A controller for a wind turbine having a first rotor blade, a second rotor blade, and a third rotor blade, the controller being for controlling activation of individual pitch control of the first, second, and third rotor blades, the controller being configured to perform operations, comprising:
   receive a flap load signal, from a flap loading sensor of each of the first, second, and third rotor blades, indicative of flap loading on each of the respective first, second, and third rotor blades;
   determine, based on the received flap load signals, a first statistical dispersion parameter of flap loading for the first rotor blade, a second statistical dispersion parameter of flap loading for the second rotor blade, and a third statistical dispersion parameter of flap loading for the third rotor blade, the first, second, and third statistical dispersion parameters being indicative of a wind event in a wind field in which the wind turbine operates;
   determine a highest statistical dispersion parameter of the first, second, and third statistical dispersion parameters;
   determine that the highest statistical dispersion parameter exceeds a threshold; and
   based on the highest statistical dispersion parameter exceeding the threshold, control activation of individual pitch control.

2. The controller according to claim 1, wherein the wind event includes turbulence in the wind field.

3. The controller according to claim 2, wherein each of the first, second, and third statistical dispersion parameters is a standard deviation of flap loading for the respective first, second, and third rotor blades.

4. The controller according to claim 2, wherein the threshold is a prescribed turbulence threshold.

5. The controller according to claim 4, wherein the controller is configured to deactivate the individual pitch control if the highest statistical dispersion parameter falls below a second prescribed turbulence threshold less than the prescribed turbulence threshold.

6. The controller according to claim 2, wherein, prior to determining the first, second, and third statistical dispersion parameters, the controller is configured to remove frequency content, from the received flap load signals, that is targeted by the individual pitch control to obtain modified flap load signals, the first, second, and third statistical dispersion parameters being determined based on the modified flap load signals.

7. The controller according to claim 6, wherein the individual pitch control is for targeting 1P frequency content, and wherein the controller for controlling activation of the individual pitch control is configured to:
   obtain, based on the received flap load signals, a flap loading vector in a rotor coordinate frame of the wind turbine;
   apply a coordinate transformation to the flap loading vector to obtain first and second mutually orthogonal components in a fixed coordinate frame of the wind turbine, wherein the coordinate transformation transforms 1P frequency content in the rotor coordinate frame to 0P frequency content in the fixed coordinate frame;
   remove the 0P frequency content from the first and second mutually orthogonal components to obtain 1P frequency content removed first and second components; and
   apply an inverse coordinate transformation to the 1P frequency content removed from the first and second components to obtain the modified flap load signals.

8. The controller according to claim 7, wherein the individual pitch control is for targeting frequency content, and wherein, prior to applying the inverse coordinate transformation, the controller is configured to apply a further transformation to the removed first and second components to isolate and remove frequency content corresponding to frequency content in the rotor coordinate frame, and to apply an inverse further transformation to obtain and removed first and second components, the inverse coordinate transformation being applied to the removed first and second components to obtain the modified flap load signals.

9. The controller according to claim 2, wherein, prior to determining the first, second, and third statistical dispersion parameters, the controller is configured to remove low frequency content, from the received flap load signals, that is indicative of an imbalance in the wind turbine.

10. The controller according to claim 1, wherein the wind event includes wind shear in the wind field, the controller being configured to:
   determine an estimation of at least one of a tilt moment and a yaw moment relative to a rotor plane of the wind turbine, the determination being based on the received flap load signals, wherein determining the first, second, and third statistical dispersion parameters includes determining, based on the determined tilt and yaw moment estimations, a respective statistical dispersion parameter indicative of wind shear in the wind field;
   determine a rate of change parameter for the respective statistical dispersion parameter indicative of wind shear; and,
   control activation of individual pitch control based on the rate of change parameter.

11. The controller according to claim 10, wherein the tilt or yaw moment is determined via a lookup table based on the received flap load signals, wherein values of the tilt or yaw moment in the lookup table correspond to the tilt or yaw moment in the absence of individual pitch control of the first, second, and third rotor blades.

12. The controller according to claim 10, wherein the controller is configured to activate the individual pitch control if:

the rate of change parameter is above a prescribed shear threshold.

13. A wind turbine comprising a controller according to claim 1.

14. A method for a wind turbine having a first rotor blade, a second rotor blade, and a third rotor blade, the method being for controlling activation of individual pitch control of the first, second, and third rotor blades, the method comprising:

receiving sensor data, from a flap loading sensor of each of the first, second, and third rotor blades, indicative of flap loading on each of the respective first, second, and third rotor blades;

determining, based on the received sensor data, a first statistical dispersion parameter of flap loading for the first rotor blade, a second statistical dispersion parameter of flap loading for the second rotor blade, and a third statistical dispersion parameter of flap loading for the third rotor blade, the first, second, and third statistical dispersion parameters being indicative of a wind event in a wind field in which the wind turbine operates;

determining a highest statistical dispersion parameter of the first, second, and third statistical dispersion parameters;

determining that the highest statistical dispersion parameter exceeds a threshold; and based on the highest statistical dispersion parameter exceeding the threshold, controlling activation of individual pitch control.

15. The method of claim 14, wherein the wind event includes turbulence in the wind field.

16. The method of claim 15, wherein each of the first, second, and third statistical dispersion parameters is a standard deviation of flap loading for the respective first, second, and third rotor blades.

17. The method of claim 15, wherein the threshold is a prescribed turbulence threshold.

18. A wind turbine, comprising:

a tower;

a nacelle disposed on the tower;

a generator disposed in the nacelle;

a rotor extending from the generator and the nacelle;

a first rotor blade, a second rotor blade, and a third rotor blade disposed on a distal end of the rotor; and a controller for controlling activation of individual pitch control of the first, second, and third rotor blades; the controller being configured to perform operations, comprising:

receive a flap load signal, from a flap loading sensor of each of the first, second, and third rotor blades, indicative of flap loading on each of the respective first, second, and third rotor blades;

determine, based on the received flap load signals, a first statistical dispersion parameter of flap loading for the first rotor blade, a second statistical dispersion parameter of flap loading for the second rotor blade, and a third statistical dispersion parameter of flap loading for the third rotor blade, the first, second, and third statistical dispersion parameters being indicative of a wind event in a wind field in which the wind turbine operates;

determine a highest statistical dispersion parameter of the first, second, and third statistical dispersion parameters;

determine that the highest statistical dispersion parameter exceeds a threshold; and based on the highest statistical dispersion parameter exceeding the threshold, control activation of individual pitch control.

\* \* \* \* \*